United States Patent
Chang et al.

(10) Patent No.: US 9,136,902 B2
(45) Date of Patent: Sep. 15, 2015

(54) METHOD AND DEVICE FOR IMPLEMENTATION OF ADAPTIVE FREQUENCY HOPPING BY POWER SPECTRAL DENSITY

(75) Inventors: Chung-Yao Chang, Zhubei (TW); Der-Zheng Liu, Xinpu Township (TW); Ming-Yuh Yeh, Taipei (TW); Kuang-Yu Yen, Zhubei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 335 days.

(21) Appl. No.: 13/095,844

(22) Filed: Apr. 27, 2011

(65) Prior Publication Data

US 2012/0076173 A1    Mar. 29, 2012

(30) Foreign Application Priority Data

Sep. 24, 2010    (TW) ................................. 99132334 A

(51) Int. Cl.
*H04B 1/00*     (2006.01)
*H04B 1/7143*   (2011.01)

(52) U.S. Cl.
CPC .... *H04B 1/7143* (2013.01); *H04B 2201/71346* (2013.01)

(58) Field of Classification Search
None
See application file for complete search history.

(56) References Cited

U.S. PATENT DOCUMENTS

| | | | |
|---|---|---|---|
| 5,155,590 A * | 10/1992 | Beyers et al. | 725/107 |
| 7,684,464 B2 | 3/2010 | Linsky et al. | |
| 7,733,938 B2 * | 6/2010 | Yang et al. | 375/132 |
| 2004/0132410 A1 * | 7/2004 | Hundal et al. | 455/67.13 |
| 2006/0133543 A1 * | 6/2006 | Linsky et al. | 375/341 |
| 2006/0183431 A1 * | 8/2006 | Chang et al. | 455/69 |
| 2007/0206660 A1 * | 9/2007 | Lifchuk | 375/132 |
| 2009/0041088 A1 * | 2/2009 | Yang et al. | 375/132 |
| 2013/0077574 A1 * | 3/2013 | Ekpenyong et al. | 370/329 |

FOREIGN PATENT DOCUMENTS

CN    101142739 A    3/2008

OTHER PUBLICATIONS

Oh, et al.: "Low Complexity FFT Based Spectrum Sensing in Bluetooth System"; School of Electrical Engineering and INMC Seoul National University, Seoul, Korea; 978-1-4244-2517-4/09/ $20.00 © 2009 IEEE; pp. 1-5.

* cited by examiner

*Primary Examiner* — Shuwang Liu
*Assistant Examiner* — Gina McKie
(74) *Attorney, Agent, or Firm* — McClure, Qualey & Rodack, LLP

(57) ABSTRACT

A wireless communication device is disclosed. The wireless communication device includes a frequency hopping communication circuit, a power spectral density circuit and a control circuit. The frequency hopping communication circuit includes a channel map. The frequency hopping communication circuit selects one of channel in a channel map to connect to another frequency hopping communication circuit according to the channel map. The power spectral density circuit for generating a power spectral density signal by measuring spectrums on all channels connected to the frequency hopping communication circuit. The control circuit receives the power spectral density and output statistical distribution data to the frequency hopping communication circuit. The frequency hopping communication circuit updates the channel map according to the statistical distribution data.

25 Claims, 10 Drawing Sheets

METHOD AND DEVICE FOR IMPLEMENTATION OF ADAPTIVE FREQUENCY HOPPING BY POWER SPECTRAL DENSITY

This application claims the benefit of the filing date of Taiwan Application Ser. No. 099132334, filed on Sep. 24, 2010, the content of which is incorporated herein by reference.

BACKGROUND (a) Technical Field

The invention generally relates to a wireless communication system and more particularly to a wireless communication system implementing adaptive frequency hopping.

(b) Description of the Related Art

A Bluetooth communication system is a frequency hopping communication system. Bluetooth includes an Adaptive Frequency Hopping (AFH) for selecting good channels to connect to other wireless device with AFH to prevent interference on a specific channel. A conventional "frequency hopping" technology is disclosed in U.S. Pat. Nos. 7,027,418 and 7,570,614. If two Bluetooth devices are connected to form a pico-net, one of the two Bluetooth devices is a master device and the other is a slave device. The AFH of Bluetooth includes an AFH channel map. One Bluetooth device may notify the other device which channel is good or bad according to the AFH channel map. The summation of good and bad channels is 79, as stipulated by the Bluetooth Specification. The AFH channel map is determined by the master device and the method of determination includes the following.

(1) The master device determines whether the channel is good or bad according to the status of reception and transmission on the channel.

(2) The master device transmits a signal to poll the channel status of the slave device. The slave device responds to the master device the channel status. Thus the master device can update the AFH channel map according to the channel status of both the master device and slave device.

Thus, it is clear that both of the master device and the slave device should be able to detect the performance of channels.

However, the conventional Bluetooth with AFH may only detect the channel quality of the channels currently in use but cannot acquire the channel quality of the rest of channels (which are not hopping in). Therefore, the problems have arisen:

(1) Once the channels in the AFH channel map are divided into a good and bad channel group, the AFH of Bluetooth implements frequency hopping and measures the channel quality within the good channel group. However, if there is an error made by the AFH channel map statistics or caused by temporary interference, in a good channel, the good channel is determined to a bad channel. After updating the AFH channel map repeatedly, the number of good channels becomes fewer. For example, there are 79 good channels in the AFH channel map. After that, AFH of Bluetooth repeatedly implements frequency hopping and measures the channel quality during a period of time, 30 channels may become bad channels. These 30 channels include actually bad channels, error in statistics, or temporary interference. Thus the number of good channels becomes 49. Then the master device updates the AFH channel map and notifies the slave device. As a result, the number of good channels may become fewer than the AFH standard threshold (at least 20 good channels) defined in the Bluetooth Specification after AFH repeatedly updates the AFH channel map.

(2) When the AFH of Bluetooth detects that the number of good channels are fewer than the standard threshold or wants to add good channels, the AFH of Bluetooth needs to set some of bad channels into good channels and update the AFH channel map. However, since the actual status of the new good channels originally considered as bad channels are unknown, Bluetooth transmission might be influenced. If the channel quality of the new channels is bad, the quality of frequency hopping by Bluetooth is seriously affected. In addition, the AFH of Bluetooth cannot remove the bad channels that are added by mistake until the AFH of Bluetooth updates the AFH channel map again.

Furthermore, more and more system manufacturers want to combine Wireless Local Area Network (WLAN) and Wireless Personal Area Network (WPAN) in a dual-mode. WLAN can cover farther transmission distance and provide a higher transmission speed to thereby communicate with external networks. For example, WLAN can use Asymmetric Digital Subscriber Line (ADSL) to connect an external internet. WPAN can provide the peer-to-peer data transmission in Digital Home system and cover closer transmission distance. The characteristic of WPAN is simple and electricity-saving.

Bluetooth has the highest marketing share and maximum number of users, and is the most widely used system In WPAN. WLAN and WPAN can be separately integrated into the transceiver of a Digital Home system. A Digital Home system may be a personal computer (PC), a notebook (NB), a smart phone, a set-top box, a television, a game console . . . etc. In this manner, the manufacturer may suffer from more complex design and higher cost, and take more time to develop products of WLAN and WPAN.

Despite the above mentioned limitations, Bluetooth has other advantages described below. First, Bluetooth and WLAN operate within a bandwidth of 2.4 GHz (ISM-band), which is free of charge. Bluetooth operates within 1 MHz bandwidth and includes 79 channels from 2402 MHz to 2480 MHz. On the other hand, WLAN operates within a bandwidth of 20 MHz in the G-mode and operates within a bandwidth close to 40 MHz in the 11 N-mode. The center frequency within the first channel of WLAN being the lowest frequency is 2412 MHz and the center frequency within the 11th channel of WLAN being the highest frequency is 2462 MHz. Further the center frequency within the 14th channel of WLAN is defined as 2484 MHz in some countries. Therefore, the channels used by Bluetooth and WLAN almost entirely overlap with each other. For example, if Bluetooth transmits data via a bandwidth which overlaps that of WLAN, the transmission quality of WLAN within the overlapped bandwidth can be seriously affected, and vice versa.

BRIEF SUMMARY

One object of the present invention is to provide a wireless communication device that can solve the above mentioned problems of the prior art.

Another object is to provide a wireless communication device having a function of rapidly and correctly determining the performance of channels.

In a preferred embodiment, the wireless communication device is a Bluetooth system.

One object is to provide a wireless communication device applicable to at least two kinds of communication technologies and capable of co-existing without interference.

In a preferred embodiment, the two kinds of communication technologies are Bluetooth and wireless local area network (WLAN).

In a preferred embodiment, bandwidths of the at least two kinds of communication technologies overlap.

Another objective is to provide a wireless communication device combining Wireless Local Area Network (WLAN) and Wireless Personal Area Network (WPAN) in a dual-mode.

In a preferred embodiment, WLAN can cover a farther transmission distance, provide a higher transmission rate compared with WPAN. The WLAN may further communicate with an external network. The WPAN can provide the peer-to-peer data transmission in Digital Home system and cover a shorter transmission distance compared with WLAN but is simple and electricity-saving.

One objective of a preferred embodiment is to set the power spectral density (PSD) circuit in the WLAN to estimate the quality of channels of Bluetooth. Then the PSD circuit provide channel quality information to the adaptive frequency hopping (AFH) of Bluetooth. Thus the AFH of Bluetooth can accurately determine whether a channel is good or bad. Further the AFH of Bluetooth may shorten the time on determination of channel quality according to channel quality information from PSD circuit. The AFH of Bluetooth may avoid adding bad channels into the good channel group and prevent from serious damage to the Bluetooth transmission due to few numbers of good channels.

These and other objects (not specifically mentioned herein) will be appreciated by persons skilled in the art.

DETAILED DESCRIPTION

Adaptive Frequency Hopping (AFH) is a technique that addresses serious interference issues. Bluetooth adopts AFH to avoid the frequency interference simultaneously created by multiple devices located in the same physical area.

Figure 1:
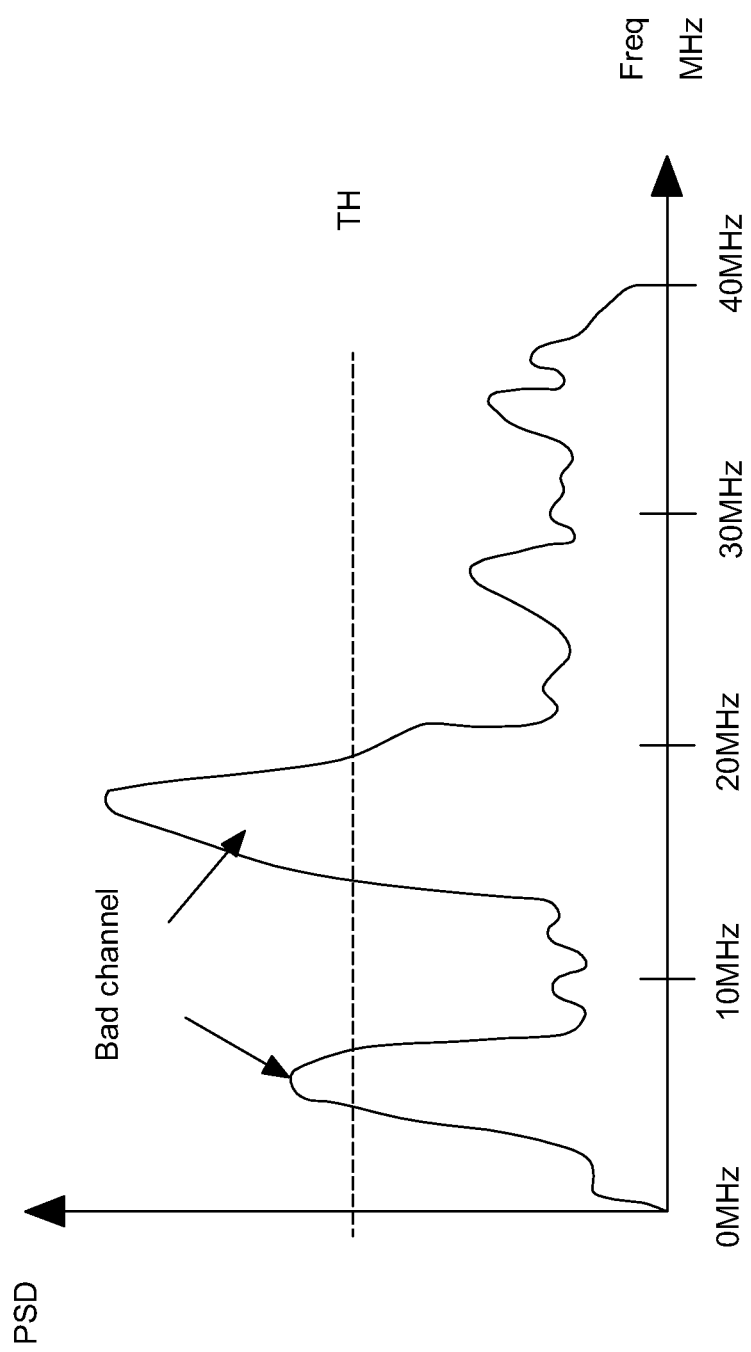
FIG. 1 is a schematic diagram illustrating the Power Spectral Density (PSD) distribution diagram within a bandwidth of Bluetooth.

With reference to an example in FIG. 1, a Power Spectral Density (PSD) distribution diagram within a bandwidth of Bluetooth is disclosed. The PSD value indicates the magnitude of power for each frequency in the frequency domain. When the PSD value of a frequency higher than the other frequency, usually means that a data transmission is processed at the frequency or the more the interference is at the frequency. Thus, when a PSD distribution in a bandwidth of Bluetooth is shown, such as FIG. 1, a designer may set a PSD value as a threshold, and determine that the frequencies with higher PSD values than the threshold are interfered by constant interference sources, where the constant interference source might be a WLAN signal interference, a narrowband interference or a broadband interference. A frequency with a high PSD value can be treated as a bad channel for the AFH mechanism of Bluetooth. When the Bluetooth communication device transmits data by the frequency hopping mechanism, the bad channels should be eliminated to keep the transmission quality steady. One embodiment of the present invention monitors the magnitudes of the energy at each of the frequencies in frequency domain to acquire the real-time interference state at all the frequencies of Bluetooth.

Figure 2A:
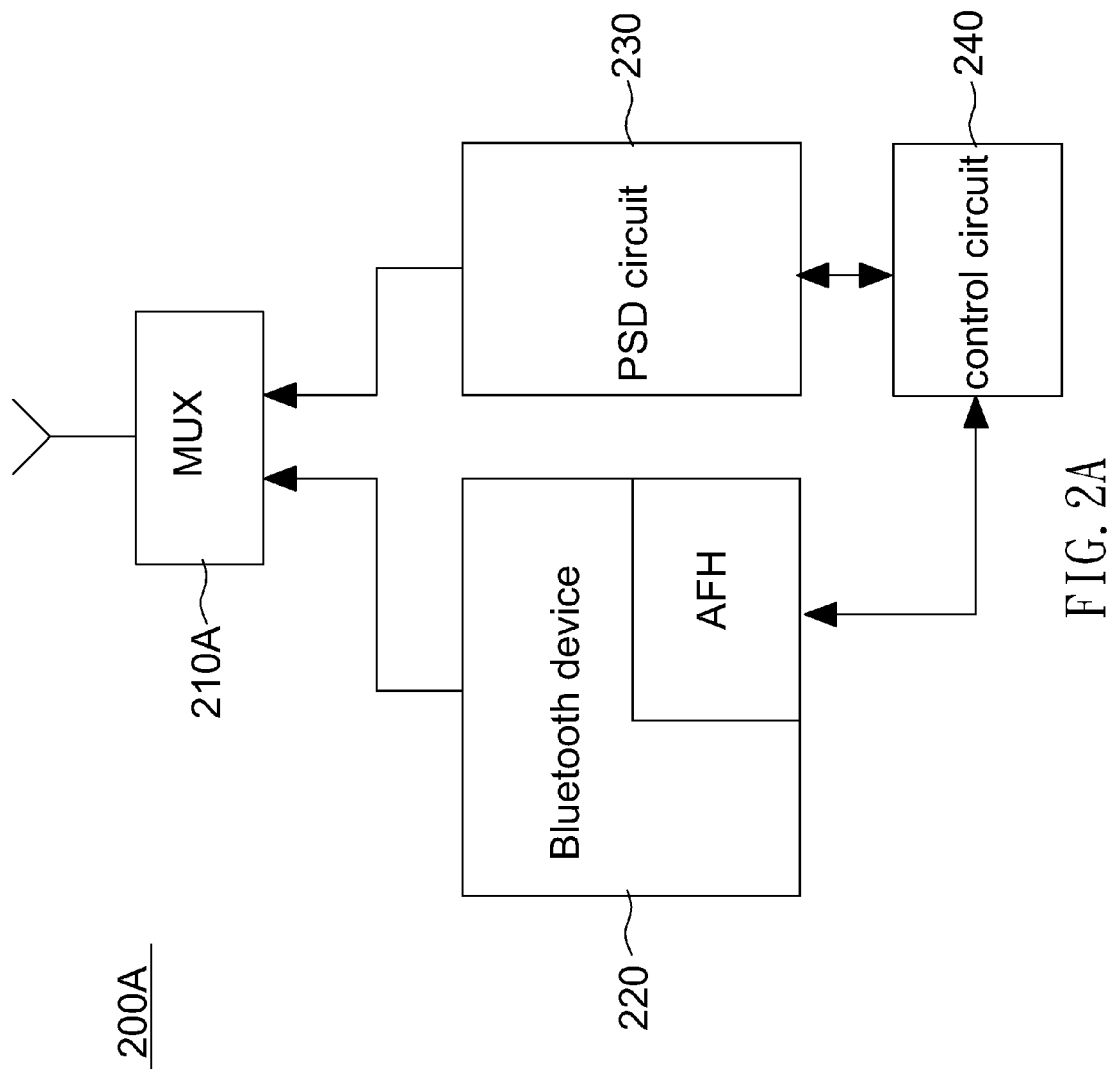
FIG. 2A is a block diagram illustrating an embodiment of a wireless transceiver with a single antenna.
Figure 2B:
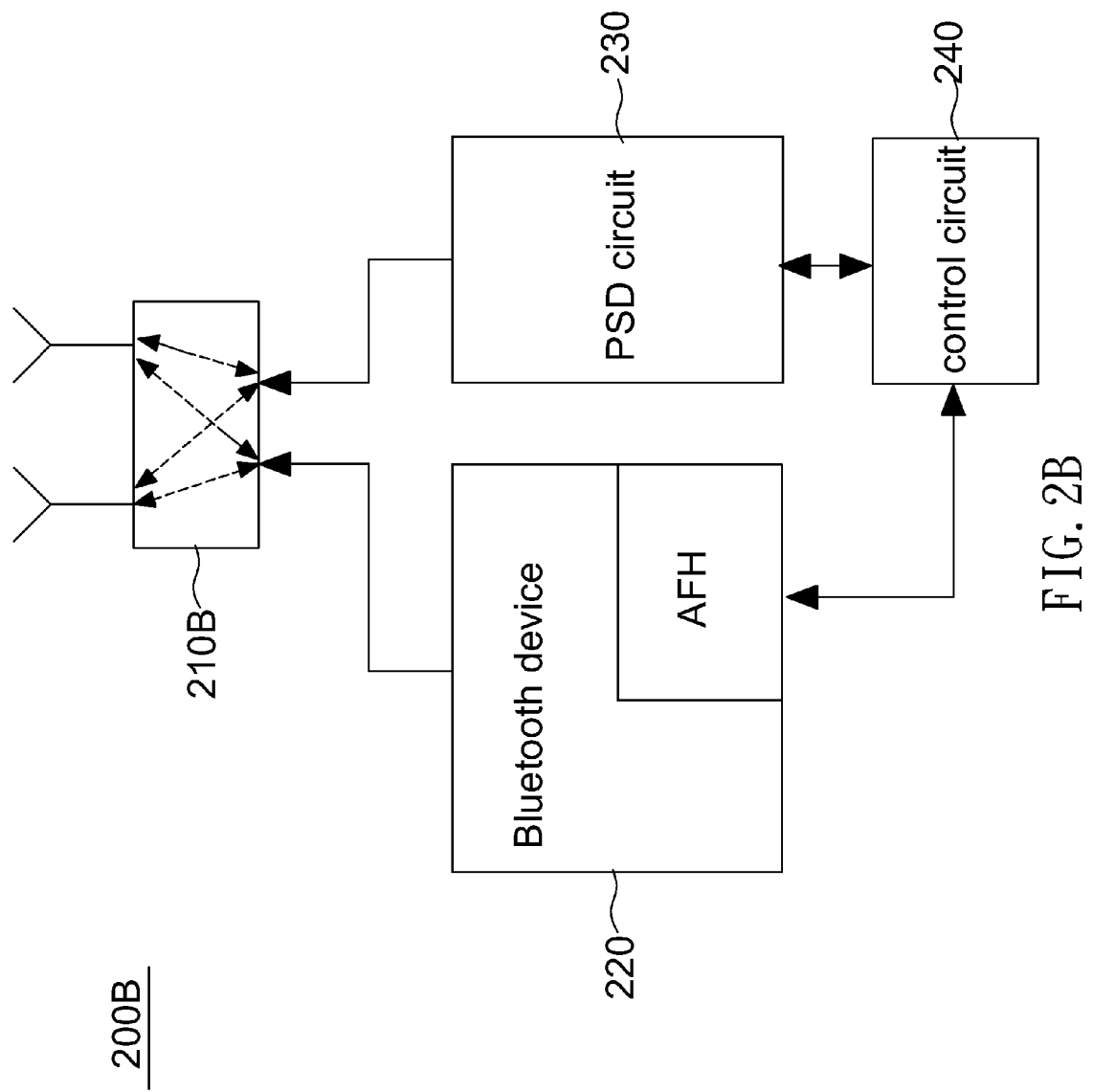
FIG. 2B is a block diagram illustrating an embodiment of a wireless transceiver with multiple antennas.

FIG. 2A is a block diagram illustrating an embodiment of a wireless transceiver with a single antenna. FIG. 2B is a block diagram illustrating an embodiment of a wireless transceiver with multiple antennas.

As shown in FIG. 2A, the wireless transceiver 200A may include an antenna, a multiplexer 210A, a Bluetooth transceiver 220, a PSD circuit 230 and a control circuit 240. As shown in FIG. 2B, the wireless transceiver 200B may include multiple antennas, a switch 210B, a Bluetooth transceiver 220, a PSD circuit 230 and a control circuit 240. The Bluetooth transceiver 220 includes an AFH channel map, for selecting a channel in turn from a plurality of channels according to the AFH channel map to connect to another frequency hopping communication device. The PSD circuit 230 measures the spectra of a bandwidth comprising all the channels of the wireless transceiver 200A to generate the PSD signals. The control circuit 240 updates the AFH channel map according to the PSD signals.

Since the antennas, as well as Bluetooth transceiver, are well-known by persons skilled in the art, the further details of these embodiments need not be described herein.

Figure 3:
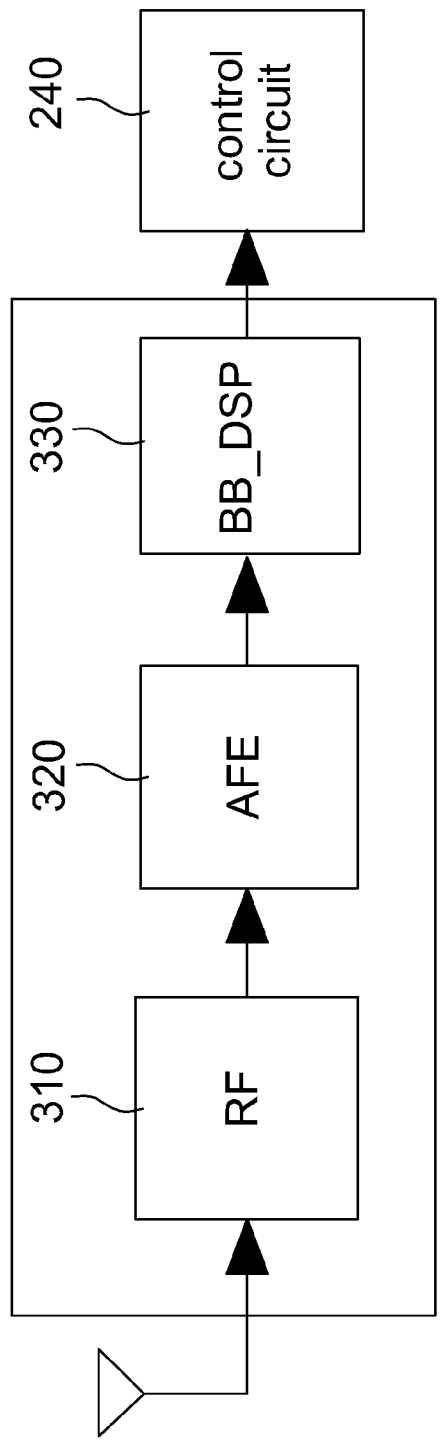
FIG. 3 is a block diagram illustrating details of an embodiment of a PSD circuit.

FIG. 3 is a block diagram illustrating certain details of an embodiment of the PSD circuit 230. The PSD circuit 230 includes a radio frequency (RF) circuit 310, an analog front-end circuit (AFE) 320, and a baseband (BB) digital signal processor (DSP) 330. After measuring the power spectral density by PSD circuit 230, the PSD signal is transmitted to the control circuit 240. The control circuit 240 analyzes the PSD signals to generate PSD statistical distribution data. The PSD statistical analysis may be performed by a processor, software, hardware (such as ASIC), a microprocessor or a firmware.

The operating frequency band of the RF circuit 310 is set within the range of frequency hopping bandwidth of a Bluetooth transceiver 220. Thus, the PSD circuit 230 may generate a PSD distribution suitable to the Bluetooth. The analog front-end circuit 320 receives an output signal from the RF circuit 310 to generate a time-domain digital signal. The baseband digital signal processor 330 includes a time-domain to frequency-domain (TDFD) transformation circuit 400. The TDFD transformation circuit 400 converts the time-domain digital signal into a frequency-domain digital signal. Further the baseband digital signal processor 330 processes the frequency-domain digital signal and generates the PSD distribution of the spectral from the communication device connected to the Bluetooth transceiver 220. In an embodiment, the baseband digital signal processor 330 may generate the PSD distribution without processing PSD statistical analysis by the control circuit 240.

In an embodiment, the control circuit 240 may perform a predetermined analysis with the PSD signal. For instance, the control circuit 240 may repeatedly analyze the PSD signal at the same bandwidth to calculate an average PSD distribution, thereby increasing the accuracy of the statistics analysis result. In order to rapidly change the predetermined analysis method and retain modification flexibility, the above mentioned statistic method may be implemented properly by software.

By referring to FIG. 2A and FIG. 2B collectively, after the PSD circuit 230 and the control circuit 240 generate the PSD distribution, a communication means is set to transmit the PSD distribution to Bluetooth transceiver 220. Further the Bluetooth transceiver 220 determines the next AFH channel map according to the PSD distribution. In an embodiment, the communication means may be a register or a transmission channel capable of being accessed by the Bluetooth transceiver 220 and the control circuit 240. Since Bluetooth transceiver 220 of embodiments generates a more accurate AFH channel map due to receiving the PSD distribution, the problems in the prior art can be solved.

Figure 4:
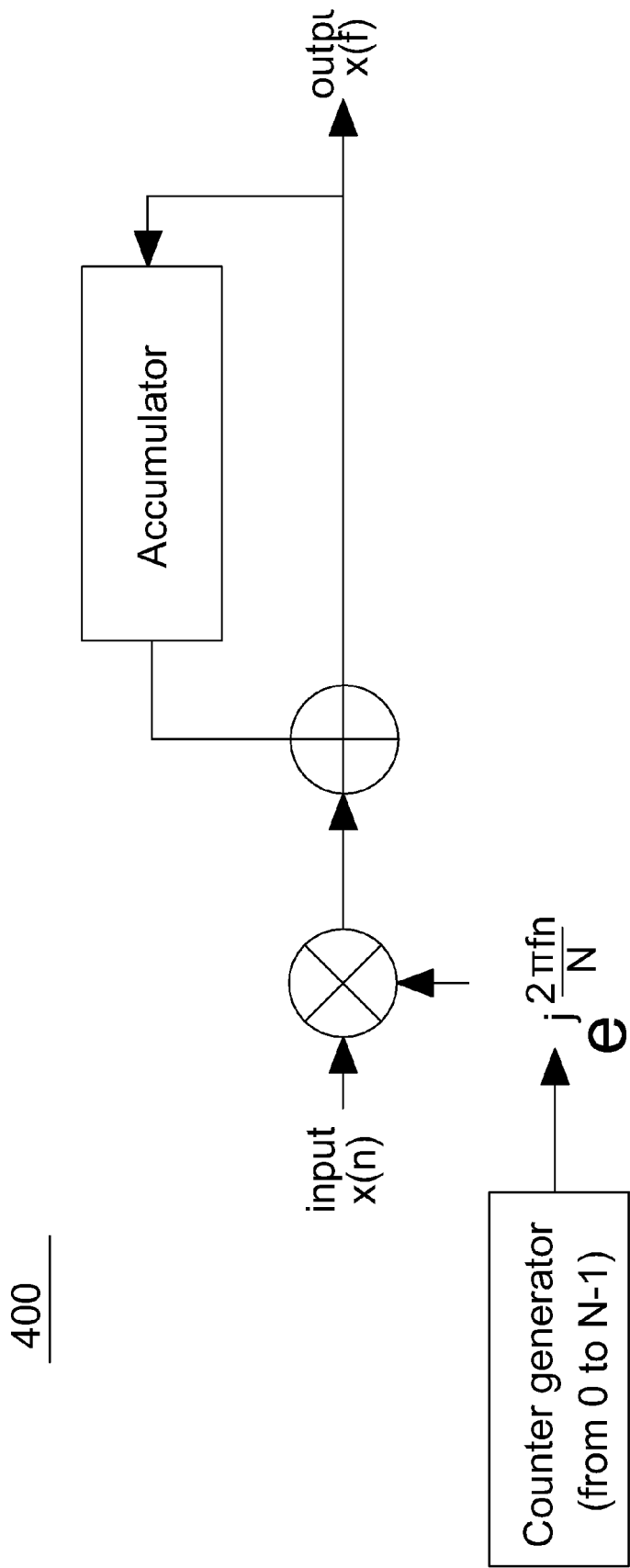
FIG. 4 is a schematic diagram illustrating details of an embodiment of a time-domain to frequency-domain (TDFD) transformation circuit.

FIG. 4 is a schematic diagram illustrating the details of an embodiment of the TDFD transformation circuit 400. The TDFD transformation circuit 400 includes a counter (such as a counter generator), an accumulator, a multiplier and an adder. In an embodiment, the TDFD transformation circuit 400 may be a Fast Fourier Transform (FFT) circuit. The Fast Fourier Transform can be expressed by the following equation:

$$X(f) = \sum_{n=0}^{N-1} x(n) \cdot e^{-j\frac{2\pi f n}{N}}$$

Hereinafter X represents an output signal in the frequency domain and f represents a designated frequency in a spectrum. Further x represents an input signal belonging to the time domain and, n represents a given time point on a time axis, and N represents the summation of number counted by the counter. In addition to the above mentioned FFT operation, the TDFD transformation circuit 400 may further operate with a predetermined analyzing method (for example, an averaging method) to generate the digital signal in frequency domain. Thus, the baseband digital signal processor 330 can generate the PSD distribution with reference to the frequency-domain digital signal.

The wireless transceiver of embodiments may operate with a single antenna as well as a dual antenna. With a single antenna structure, as shown in FIG. 2A, the Bluetooth transceiver 220 and the PSD circuit 230 share the single antenna. Further the use of the single antenna is switched by the wireless transceiver 200A from the Bluetooth transceiver 220 to the PSD circuit 230, or vice versa according to the Time-Division Multiplexing mechanism. That is, when Bluetooth transceiver 220 is idle, the wireless transceiver 200A can be switched to the PSD circuit 230. Thus, the PSD circuit 230 can receive a time-domain signal via the single antenna.

Figure 5:
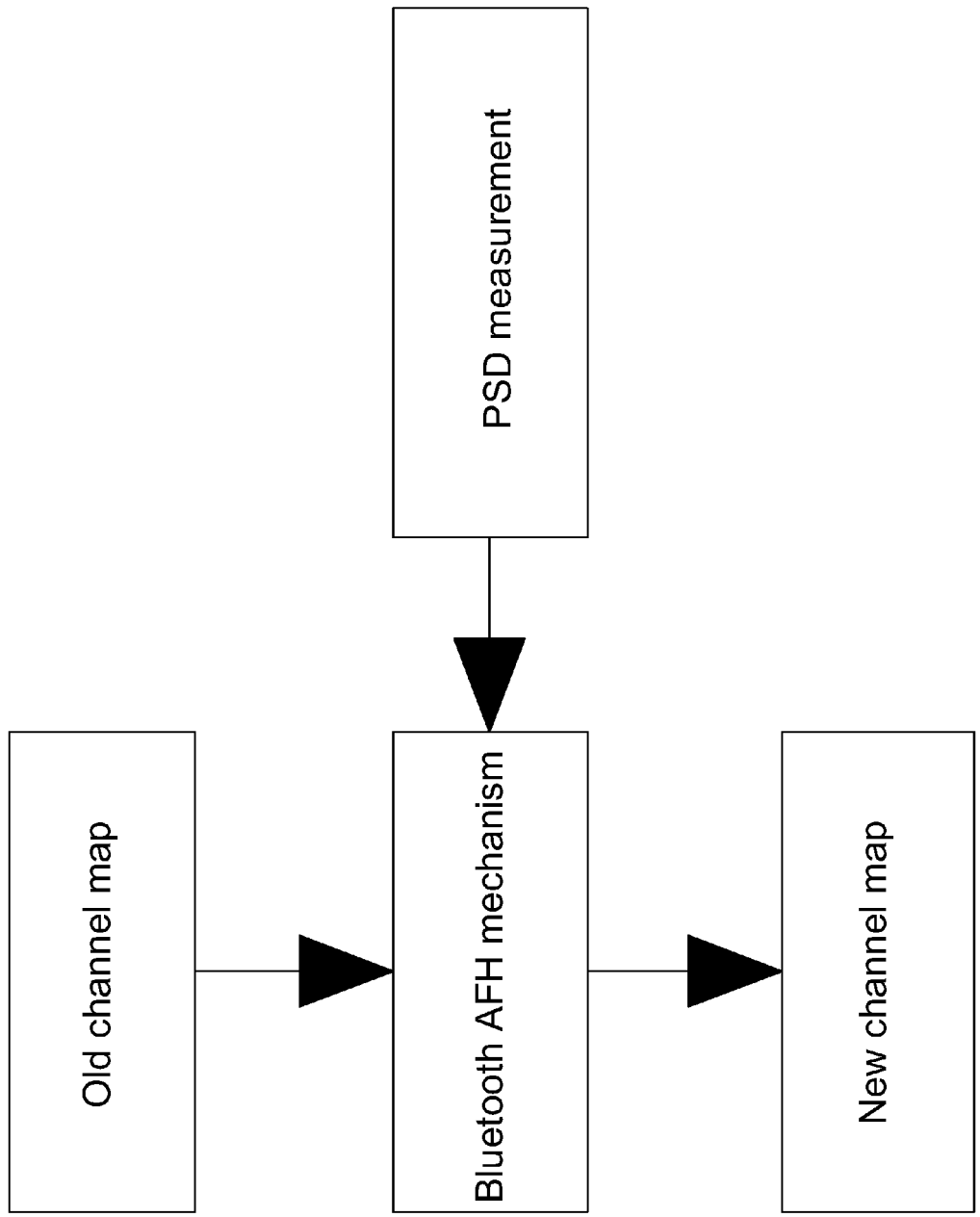
FIG. 5 is a flow chart illustrating an embodiment of determination of a new AFH channel map by the PSD statistical analysis.

Furthermore, with a dual antenna structure as shown in FIG. 2B, the Bluetooth transceiver 220 can receive signals via one of the antennas and the PSD circuit 230 can also receive signals via the other antenna at any moment. In another embodiment, Bluetooth transceiver 220 may determine to output instructions to the PSD circuit 230 or not according to the judgment of AFH. The PSD circuit 230 may receive the instructions via the above mentioned communication means, and can be enabled or disabled according to the instructions. Consequently all channels or part of channels of the Bluetooth transceiver 220 can be rapidly and accurately determined FIG. 5 is a flow chart illustrating an embodiment of determination of a new AFH channel map by the PSD statistical analysis. In other words, the built-in AFH of Bluetooth transceiver can determine the new AFH channel map in accordance with the results of PSD statistical analysis. In an embodiment, the built-in AFH of Bluetooth transceiver can remove the channel identified by PSD statistical analysis as a bad channel.

Figure 6:
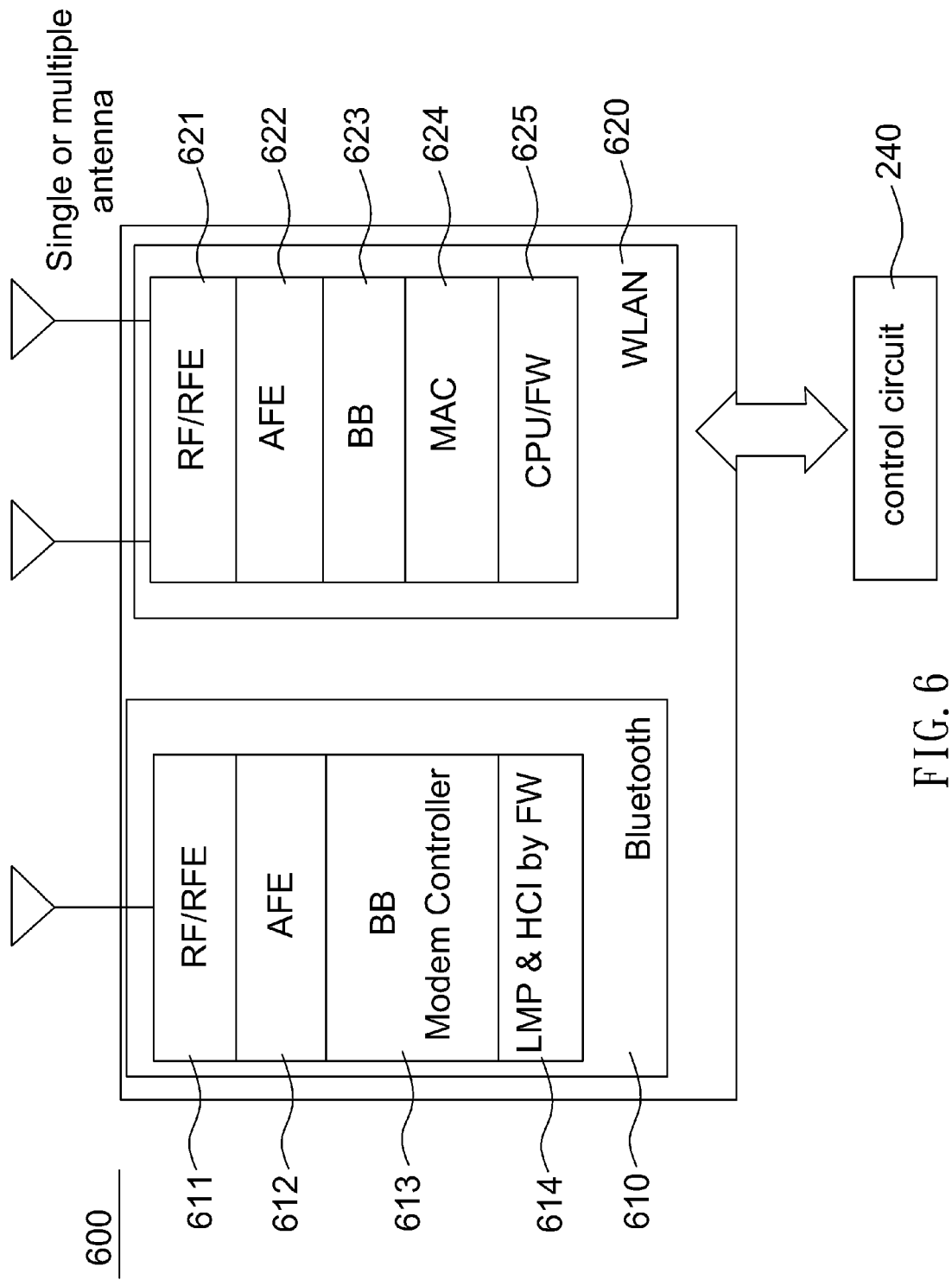
FIG. 6 is a schematic diagram illustrating another embodiment of a wireless transceiver.

FIG. 6 is a schematic diagram illustrating another embodiment of a wireless transceiver. The wireless transceiver 600 may be applicable to a dual-mode. The wireless transceiver 600 includes a Bluetooth device 610, wireless local area network (WLAN) device 620 and a control circuit 630. As shown in FIG. 6, the Bluetooth device 610 may include a radio frequency (RF/RFF) circuit 611, an analog front-end circuit (AFE) 612, and a baseband (BB) modem controller 613 and a Firmware (FW) (such as a load micro-program (LMP) and a host computer interface (HCI)) 614. The WLAN device 620 may include a radio frequency (RF/RFF) circuit 621, an analog front-end circuit (AFE) 622, and a baseband (BB) circuit 623, a media access control (MAC) circuit 624 and a central processing unit (CPU)/Firmware (FW) 625. Since the embodiment does not focus on the structure of wireless transceiver, the detailed description of the structure of wireless transceiver need not be provided herein.

In an embodiment, the WLAN device 620 includes a PSD circuit to implement the PSD statistical distribution function. For example, the PSD circuit can be the PSD circuit 230 in FIG. 3 such as including the radio frequency circuit 621, the analog front-end circuit 622 and a baseband circuit 623. The WLAN device 620 has built-in WLAN software corresponding to PSD mechanism so that it is easy to amend the PSD statistical distribution function in the built-in WLAN software. Thus no additional hardware cost is needed in this embodiment.

In the dual-mode, the wireless transceiver 600 can achieve far-end or near-end data transmission. The WLAN device 620 serves as a PSD circuit to provide PSD statistical analysis data to the Bluetooth device 610. Further AFH of the Bluetooth device 610 can determine good frequency channels to connect to other communication device with AFH. Therefore, the Bluetooth device can coexist with and WLAN device without interfering with each other.

In an embodiment, the wireless transceiver 600 may apply to the above mentioned single antenna and dual antenna structures in the dual-mode. It should be noted that the PSD circuit implements PSD statistical analysis only when WLAN is idle.

Since the bandwidth used by the WLAN transceiver and the PSD statistical analysis data can be accessed in a register or a data transmission channel, the AFH of Bluetooth transceiver can acquire the information of which channel is transmitting data or whether interference occurs. Thus, the Bluetooth transceiver can update the AFH channel map more accurately. On the basis of the above, in an embodiment, the existing WLAN chip and Bluetooth chip can be used to implement certain technical features of the embodiments. For example, as shown in FIG. 1, in the traditional solution, the WLAN and Bluetooth are separated into two integrated chips (IC).

In one embodiment, the WLAN and Bluetooth system can be integrated into a single chip (System on Chip) and then the technical features of PSD statistical analysis is added into the single chip. Therefore the manufacturers can put the single chip into a transceiver to reach the purpose of integrating a plurality of different transmission specifications into a device with dual-mode for wireless transmission.

Figure 7:
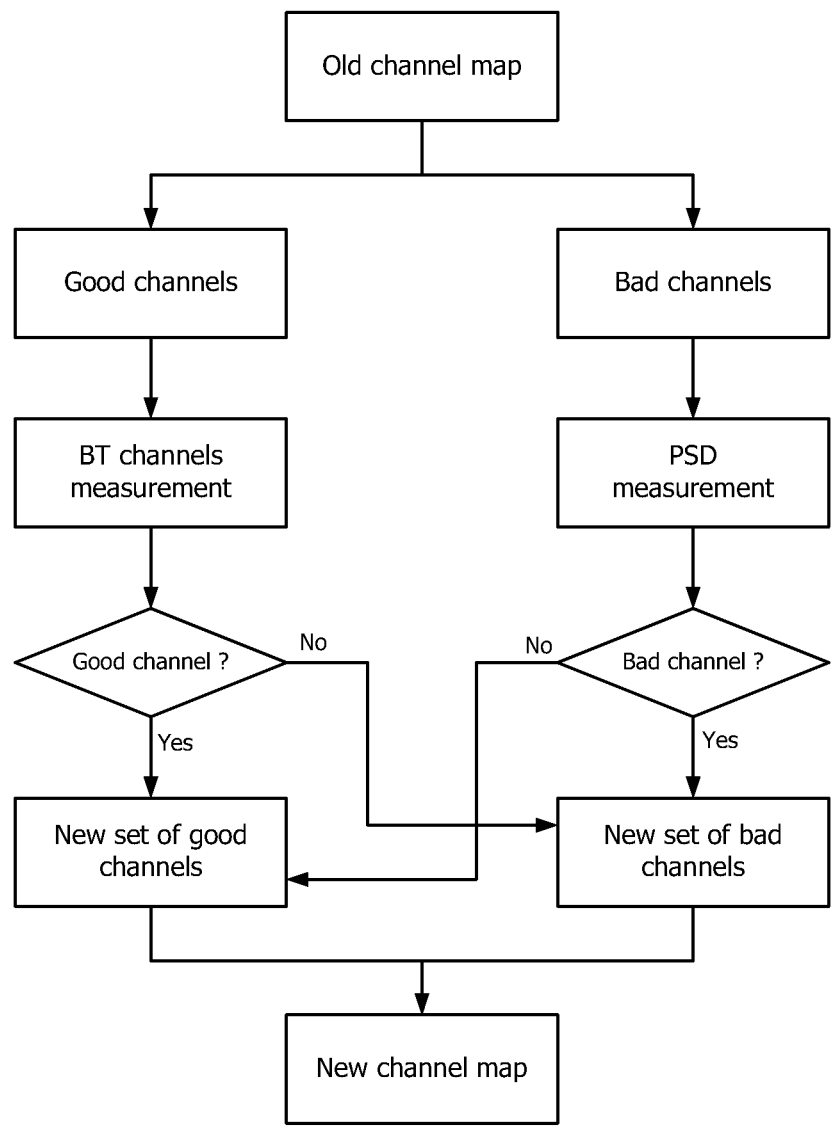
FIG. 7 is a flow chart illustrating an embodiment of a method of updating the channel map according to the Bluetooth measurement result and the PSD data.

Furthermore, FIG. 7 is a flow chart illustrating an embodiment of a method for measurement of a new channel map with a composite determination mechanism. The method includes the conventional measuring method of Bluetooth and the PSD measurement method of the embodiments. Please note that such a composite determination mechanism may include many variations.

In one embodiment, the measurement result generated from the conventional measuring method of Bluetooth determines the channel map and then the channel map is updated based on the result of the PSD statistical analysis. In another embodiment, the result of the PSD statistical analysis is used to determine the channel map and then the channel map is updated based on the measurement result generated from the conventional measuring method of Bluetooth. In another embodiment, both measurement results are used at the same time and then the channel map is updated based on one result selected from the measurement result of Bluetooth and the PSD analysis. Furthermore, in another embodiment, both measurement results are used at the same time and the weights of the two measurement results are also used for determination.

For a practical example, at first, Bluetooth includes 79 channels which are good channels initially. After a period of the transmission, the AFH of Bluetooth distinguishes exactly good channels and bad channels by using the status information on each channel of Bluetooth. The status information may be Cycle Redundancy Check (CRC), Header Error Control (HEC), packet miss ratio, or other commonly used references . . . etc. Then, the PSD circuit persistently monitors the bad channels in the channel map to generate PSD statistical data for each channel. In view of the frequency spectrum, when the interference does not occur on the bad channel, the PSD value is relatively low. If the PSD value of a channel is lower than a specific threshold, the channel can be classified as a good channel. If the PSD value is not lower than a specific threshold, the channel remains as a bad channel. As the result, the AFH of Bluetooth may update the channel map according to the PSD value to include the state change of channel, such as adding new good channels into the good channel group. Further AFH of Bluetooth continuously determines if the original good channels are still good channels or changed to bad channels. The method of FIG. 7 may avoid adding a bad channel having interference into the good channel group. The channel in the good channel group may be eliminated because of interference or a transmission started by other communication protocols. Thus the purpose of constantly updating good channels and bad channels without any erroneous identification can be achieved. Therefore, the problems in the traditional AFH can be solved by the embodiments.

Another embodiment discloses a method for using the PSD statistical distribution map to determine the channel map. The method may start from selecting good channels. For example, each channel can be sorted out by the statistical analysis of PSD when the channel map is updated. Since the PSD value of channel is a relative value, the order of channels can be arranged by firstly selecting channels from the channel with lowest PSD value. For example, arranging the channels in order from the lowest PSD value to the highest PSD value and create a PSD sorting list, then pick the first 20 channels from the lowest PSD value channel. These 20 channels might be defined as good channels, and another five to ten channels, such as the channels from 21st to 25th or 21st to 30th, might be picked to be buffer or backup channels. Each time the map is updated, these 25-30 channels with the lower PSD value might be selected as good channels according to the PSD sorting lists at different time. Please note that each selected channel may not have correlation with each other, and all are selected according to the results of PSD sorting.

Furthermore, the specific threshold (TH) of the PSD statistical distribution map can be further divided into the relative method and the absolute method as described below.

If the relative method is used, the threshold can be adaptive adjusted according to the selected numbers of good channels and bad channels. For example, if the Bluetooth has too many bad channels to make the relative number of good channels less than 20, the predetermined threshold can be increased by the adaptive algorithm. Conversely, if the Bluetooth has too few bad channels, even 0, it indicates that the predetermined threshold is not correct and the good or bad channels cannot be determined. Therefore, the threshold can be reduced by the adaptive algorithm.

Figure 8:
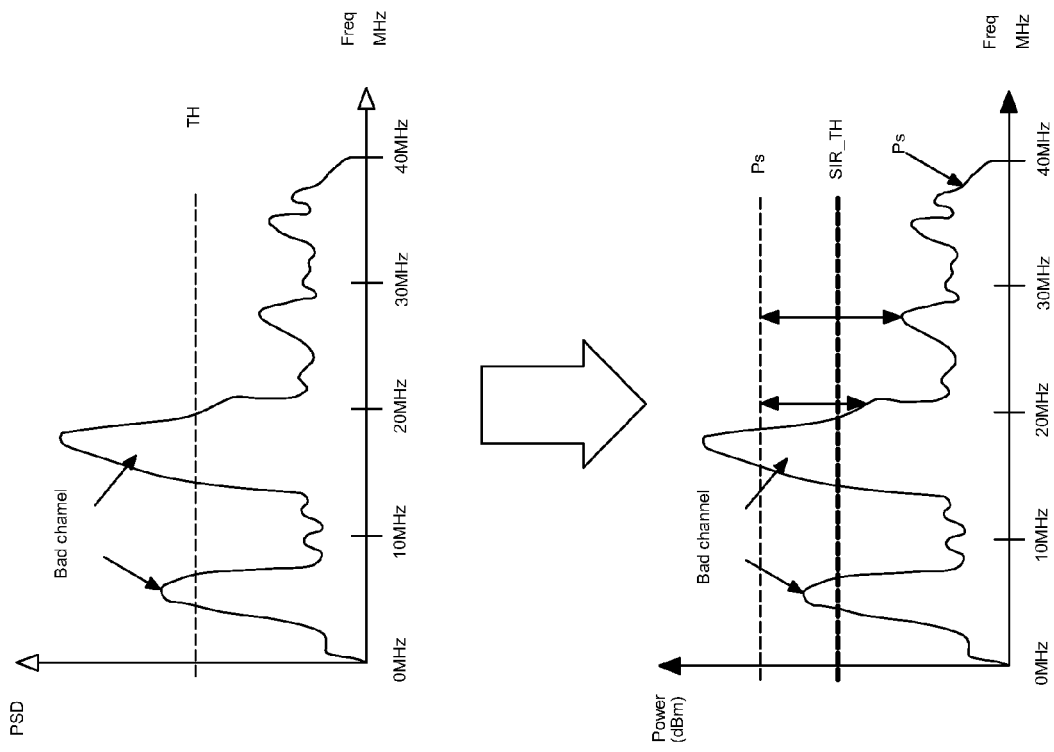
FIG. 8 is a schematic diagram illustrating an embodiment of correspondence relation between power spectrum density (PSD) and Signal-to-Interference Ratio (SIR) distribution.

If the absolute method is used, the curve in the original PSD may be an interference power (PI) curve. If the Bluetooth packet receiving power (Ps) can be obtained, as shown in FIG. 8, the PSD distribution can be transformed into a Signal-to-Interference Ratio (SIR) map, which is defined as follows.

$$SIR = \frac{P_S}{P_I} \text{ or } SIR \text{ (dB)} = 10 * \log10\left(\frac{P_S}{P_I}\right)$$

The signal intensity of Bluetooth packets can be detected by the conventional mechanism of Bluetooth. The detection method includes the following:

When Bluetooth transmits packets, in each frequency channel within AFH, the signal intensity of each channel is acquired and the average value of signal intensity values can be calculated. The described method (1) is subject to channel response or interference of different channels. For example, when the channel response is high or interference exists, the Bluetooth signal intensity becomes larger. Therefore, there may be more errors in the statistical result of the signal intensity.

At first, the PSD distribution map may be used to select the channel having the lowest interference and Bluetooth is then notified of this information. Thus Bluetooth may detect the signal intensity in this channel having the lowest interference. In this way, since there is no interference on the channel Bluetooth can receive packets correctly and calculates the signal intensity accurately. In the described method (2), Bluetooth only needs to detect the signal intensity of a single channel, but does not need to calculate a lot of complex statistics. In addition, since Bluetooth frequency hopping can hop 1,600 channels per second, for all 79 channels, in average, each channel has the opportunity to receive 20 packets in a second. For the average value of a period of time (such as 5 to 10 seconds), it is considerably accurate. The channel information including a channel having the lowest interference informed by the PSD circuit to the Bluetooth device can be regained after each PSD updating so that the method (2) can maintain the optimum state of detecting the Bluetooth signal intensity.

Figure 9:
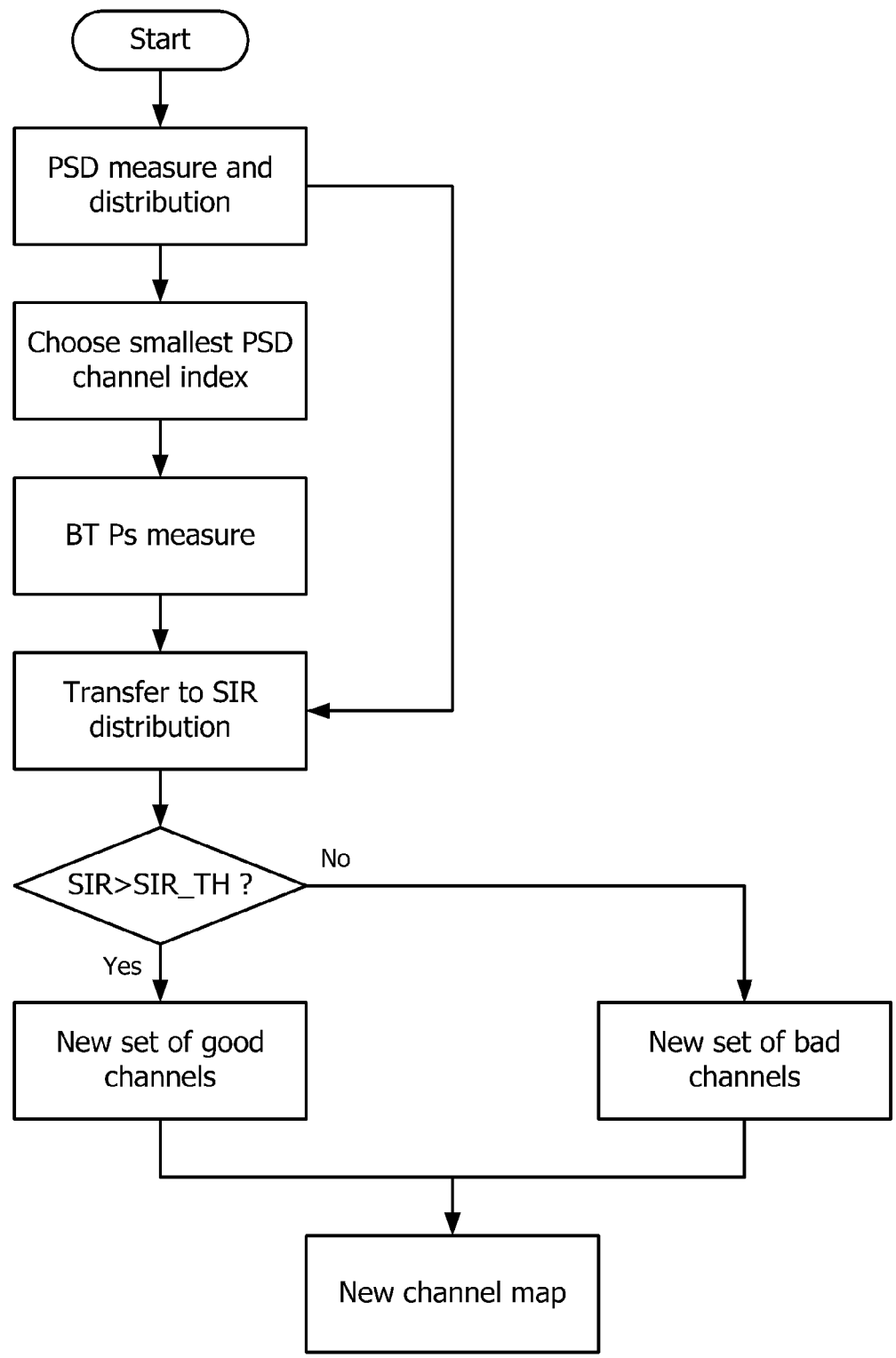
FIG. 9 is a flow chart illustrating an embodiment of a determination of the AFH channel map according to the Signal-to-Interference Ratio (SIR) distribution.

After the SIR distribution is obtained, good channels can be selected according to the Signal-to-Noise Ratio (SNR) required by a correctly decoded Bluetooth packet. Hereinafter, the interference in SIR can be equivalent to the noise in SNR. In general, the SNR required for receiving 1 Mbps and 2 Mbps packets is 15 dB and the SNR required for receiving a 3 Mbps packet is 20 dB. Thus, if the SIR is greater than 20 dB, the channel can be selected as a good channel. In an embodiment, an adjustable threshold for selecting a good channel is generated by comparing SNR with SIR. The flow chart of the above steps can be referred to FIG. 9.

In an embodiment, the above mentioned PSD circuit may be a digital circuit (such as a logical combination circuit). The digital circuit may be implemented by hardware description language (for example, VERLOG, VHDL) to define the above mentioned technical features and the EDA tool is used to implement the digital circuit. In another embodiment, the above mentioned PSD circuit may be implemented by a processor (CPU), a digital signal processor (DSP) or related software.

Those skilled in the art will readily observe that numerous modifications and alterations of the device and method may be made. Accordingly, the above disclosure should be construed as limited only by the metes and bounds of the appended claims.

What is claimed is:

1. A wireless communication device, comprising:
a single antenna;
a frequency hopping communication circuit switchably coupled to the single antenna and including a channel map for selecting a channel from a plurality of channels in turn according to the channel map to connect to a frequency hopping communication device;
a power spectral density circuit switchably coupled to the single antenna, the power spectral density circuit for measuring spectra of a bandwidth when the frequency hopping communication circuit is idle according to a time-division multiplexing process involving the frequency hopping communication circuit and the power spectral density circuit, the spectra of the bandwidth comprising all the channels of the frequency hopping communication circuit to generate power spectral density data, the power spectral density data comprising an interference power curve comprising a defined magnitude of power per channel frequency for each point on the interference power curve, where the magnitudes of power above a predefined power magnitude threshold of the curve correspond to greater interference than the magnitudes of power below the predefined power magnitude threshold; and
a control circuit, for updating the channel map according to the power spectral density data.

2. The device according to claim 1, wherein the frequency hopping communication circuit is a Bluetooth communication circuit.

3. The device according to claim 1, wherein the power spectral density circuit is built in a wireless local area network device.

4. The device according to claim 1, wherein the control circuit processes statistical analysis to the power spectral density data.

5. The device according to claim 1, wherein the control circuit updates the channel map further according to the predefined power magnitude threshold.

6. The device according to claim 5, wherein the predefined power magnitude threshold is adjustable and generated by comparing Signal-to-Noise Ratio with Signal-to-Interference Ratio.

7. The device according to claim 1, wherein the frequency hopping communication circuit acquires a packet receiving power of a single channel within the plurality of channels, so as to adaptive adjust a number of good channels and bad channels.

8. A wireless communication method, comprising:
selecting a channel from a plurality of channels received via a first antenna in turn according to a channel map by a frequency hopping communication circuit to which the first antenna is coupled, so as to connect to a frequency hopping communication device;
measuring by a power spectral density circuit a spectra of a bandwidth comprising all the channels of the frequency hopping communication circuit received via a second antenna coupled to the power spectral density circuit;
generating power spectral density data based on the measured spectra, the power spectral density data comprising an interference power curve comprising a defined magnitude of power per channel frequency for each point on the interference power curve, where the magnitudes of power above a predefined power magnitude threshold of the curve correspond to greater interference than the magnitudes of power below the predefined power magnitude threshold; and
updating the channel map according to the power spectral density data.

9. The method according to claim 8, wherein the frequency hopping communication circuit comprises a Bluetooth communication circuit.

10. The method according to claim 8, wherein the power spectral density circuit is built in a wireless local area network device arranged in parallel with and external to the frequency hopping communication circuit.

11. The method according to claim 8, further comprising a step of processing statistical analysis to the power spectral density data.

12. The method according to claim 8, further comprising a step of updating the channel map further according to the predefined power magnitude threshold.

13. The method according to claim 12, wherein the predefined power magnitude threshold is adjustable.

14. The method according to claim 8, further comprising steps of: acquiring a packet receiving power of a single channel within the plurality of channels; and adaptive adjusting the number of good channels and bad channels within the plurality of channels according to the packet receiving power.

15. A wireless communication system, comprising:
a frequency hopping communication circuit comprising a first radio frequency circuit, a first analog front end circuit, and a first baseband circuit, the frequency hopping circuit including a first channel map for selecting a channel from a plurality of channels in turn according to the first channel map to connect to a frequency hopping communication device, the frequency hopping communication circuit using non-power magnitude measuring methods to assess only all of the good channels of the plurality of channels to determine whether each of the good channels remains good or becomes bad before updating the first channel map; and
a power spectral density circuit arranged external to and in parallel with the frequency hopping communication circuit, the power spectral density circuit comprising a second radio frequency circuit, a second analog front end circuit, and a second baseband circuit, the power spectral density circuit using power spectral density data to assess only all of the bad channels of the plurality of channels to determine whether the bad channels remain bad or become good, the power spectral density comprising an interference power curve comprising a defined magnitude of power per channel frequency, where the magnitudes of power above a predefined power magnitude threshold of the curve correspond to greater interference than the magnitudes of power below the predefined power magnitude threshold, wherein the frequency hopping communication circuit provides a second channel map in succession to the first channel map based on the assessments by the frequency hopping communication circuit and the power spectral density circuit.

16. The system according to claim 15, wherein the frequency hopping communication circuit is a Bluetooth communication circuit.

17. The system according to claim 15, wherein the power spectral density circuit is built in a wireless local area network device.

18. The system according to claim 15, wherein the second baseband circuit comprises a time-domain to frequency-domain transformation circuit to covert a time domain signal corresponding to at least one of the plurality of channels into a frequency domain signal.

19. The system according to claim 18, wherein the first and second radio frequency circuits are coupled to a single antenna.

20. The system according to claim 18, wherein the first and second radio frequency circuits are coupled to respective separate antennas.

21. A wireless transceiver, comprising:
plural antennas;
a frequency hopping communication circuit coupled to at least one of the plural antennas, the frequency hopping communication circuit including a channel map for selecting a channel from a plurality of channels in turn according to the channel map to connect to a frequency hopping communication device; and
a power spectral density (PSD) circuit arranged in parallel to the frequency hopping communication circuit, the power spectral density circuit coupled to one or more other antennas of the plural antennas, the power spectral density circuit for measuring spectra of a bandwidth comprising all the channels of the frequency hopping communication circuit to generate power spectral density data, the power spectral density data comprising an interference power curve comprising a defined magnitude of power per channel frequency for each point on the interference power curve, where the magnitudes of power above a predefined power magnitude threshold of the curve correspond to greater interference than the magnitudes of power below the predefined power magnitude threshold.

22. The wireless transceiver of claim 21, wherein the PSD circuit comprises a serial arrangement of a radio frequency circuit, an analog front end (AFE) circuit, and a baseband digital signal processor, wherein the baseband digital signal processor comprises a time-domain to frequency-domain transformation circuit.

23. The wireless transceiver of claim 22, wherein the PSD circuit is embodied in a wireless local area network (WLAN) device, the WLAN device coupled to the one or more other antennas of the plural antennas, the PSD circuit configured to provide the power spectral density data to the frequency hopping communication circuit.

24. The wireless transceiver of claim 23, wherein the PSD circuit is configured to perform statistical analysis on the spectra while WLAN device is idle.

25. The wireless transceiver of claim 21, wherein the PSD circuit measures the spectra of the bandwidth through one antenna while the frequency hopping communication circuit is using the other antenna.

* * * * *